Figure 1:
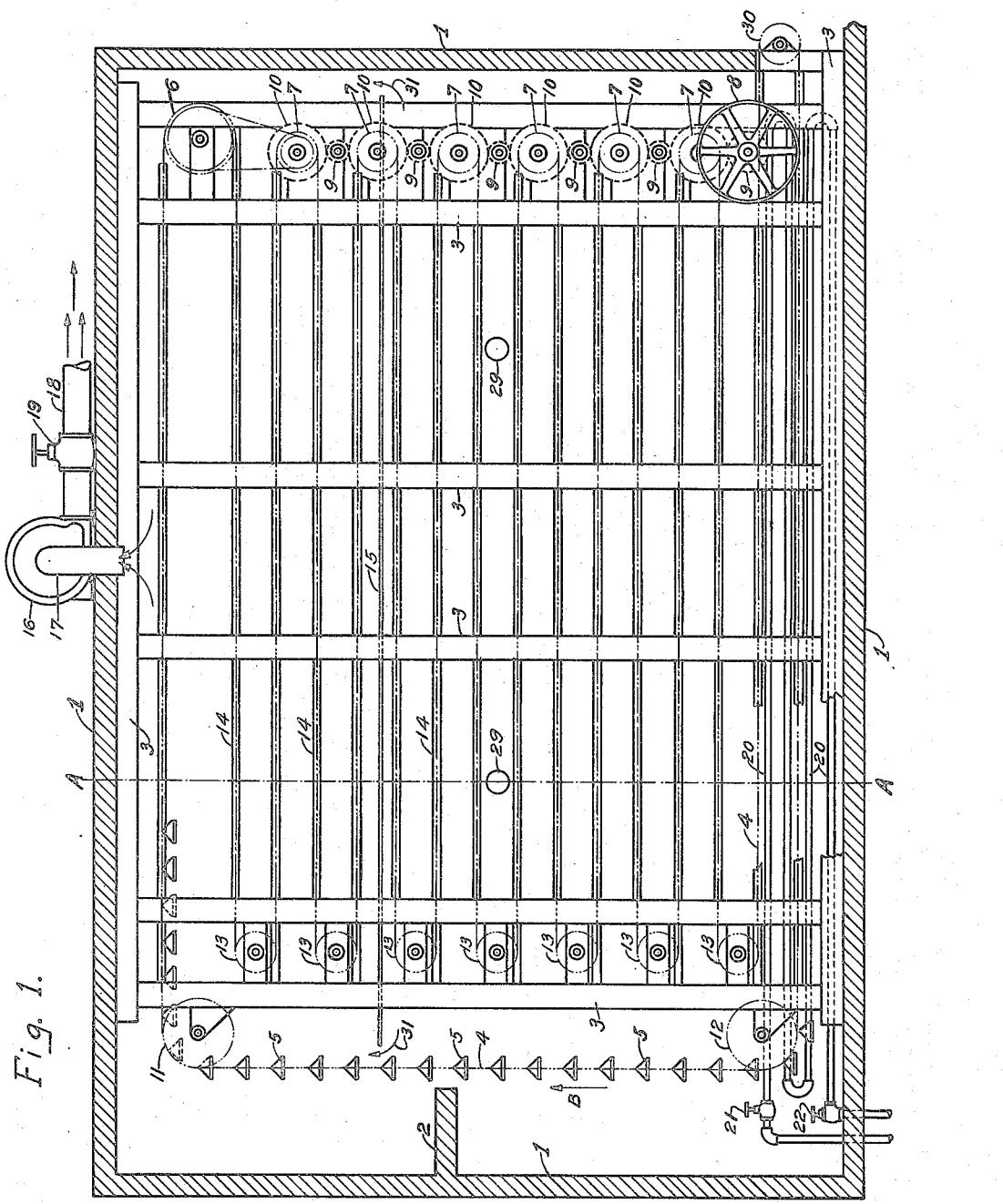

W. M. CAMPBELL.
METHOD OF COOLING AND TREATING BREAD.
APPLICATION FILED MAR. 13, 1916.

1,212,900.

Patented Jan. 16, 1917.
2 SHEETS—SHEET 1.

Witnesses

Inventor
Winfield M. Campbell
by Daniel K. Allison
Attorney.

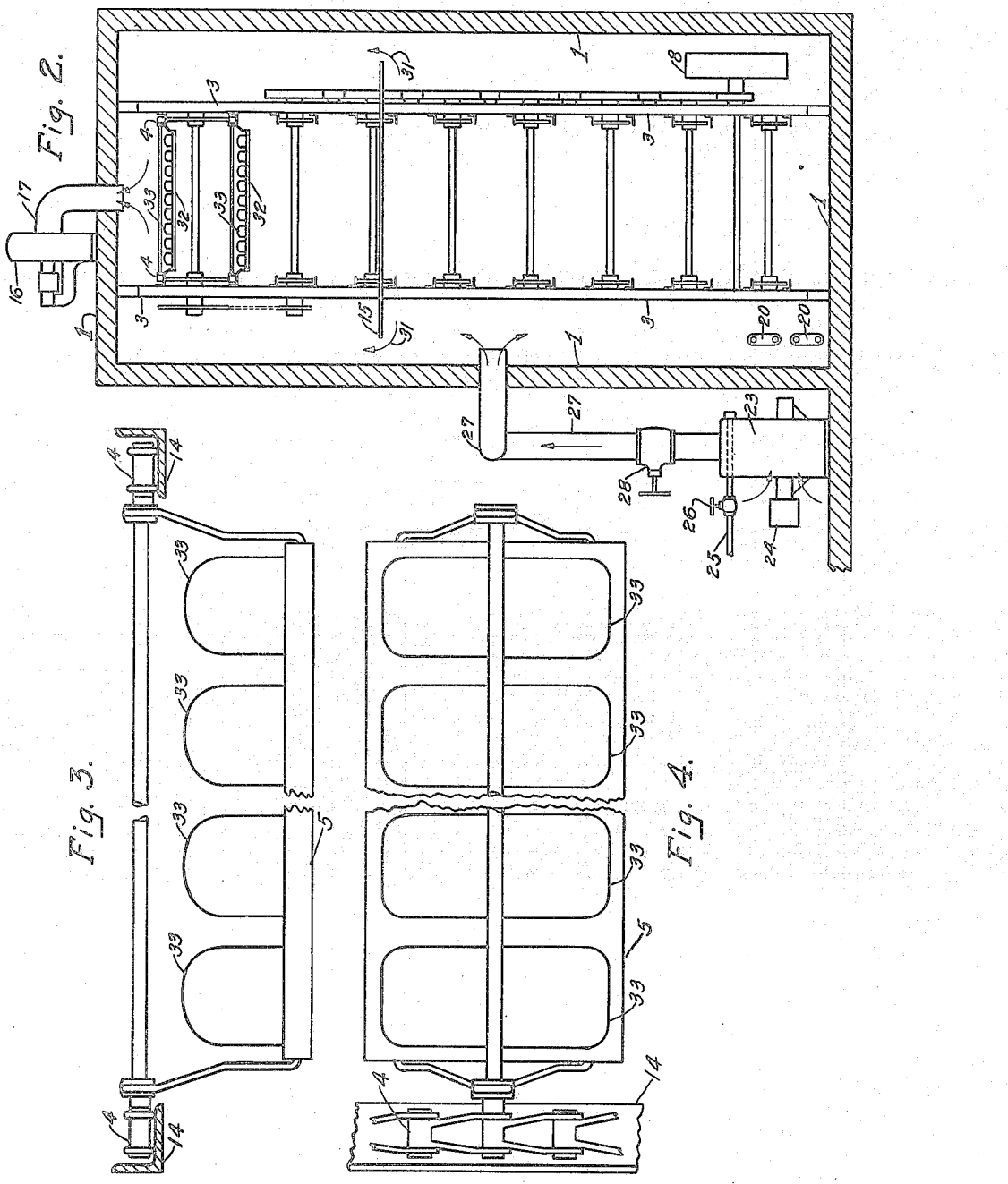

UNITED STATES PATENT OFFICE.

WINFIELD M. CAMPBELL, OF KANSAS CITY, MISSOURI.

METHOD OF COOLING AND TREATING BREAD.

1,212,900.  Specification of Letters Patent.  Patented Jan. 16, 1917.

Application filed March 13, 1916. Serial No. 83,789.

*To all whom it may concern:*

Be it known that I, WINFIELD M. CAMPBELL, a citizen of the United States, residing at Kansas City, in the county of Jackson, in the State of Missouri, have invented a certain new and useful Improvement in the Modes or Methods of Cooling and Treating Bread; and my invention relates to the method of cooling and treating hot bread directly after being taken from the bake-oven.

Its objects are, first, to cool hot bread under conditions whereby all the loaves may be cooled and treated uniformly. Second, to cool hot bread under conditions whereby the loaves may be cooled gradually. Third, to cool hot bread under conditions whereby substantially uniform measures of heat may be taken from the hot loaves during successive uniform periods of time. Fourth, to cool hot bread under conditions whereby the cooling process may take place during a predetermined period of time. Fifth, to cool hot bread under conditions whereby the cooling process may take place gradually, and also the time period during which the cooling process takes place may be lengthened or shortened as conditions may require. Sixth, to cool hot bread under conditions whereby the loaves may retain a certain degree of moisture. Seventh, to cool hot bread under conditions whereby the degree of moisture retained by the loaves may be increased or diminished to attain desired results, which conditions may be controlled and regulated by the operator.

In order to attain the best results, it is thought advisable to put my improved method or process into practice by means of a machine specially fitted and constructed for this purpose; and accordingly I will describe the construction and operation of such machine, and refer to drawings, which, together with the description thereof, are made part of this specification.

Figure 1 of the drawings is a vertical section cut longitudinally through the machine; Fig. 2 is a transverse vertical section of Fig. 1, taken on line A—A. Fig. 3 is an enlarged partial detail of one of the carrying pans with loaves of bread thereon, showing also a section of the angle irons upon which the conveyer chains ride. Fig. 4 is a partial plan view of one of the carrying pans, also showing loaves of bread thereon.

1 indicates a closed compartment shown in section in Fig. 1.

2 is a platform from which the conveyer may be loaded.

3 represents the frame of the conveyer.

4—4 represent endless conveyer chains from which carrying pans 5 are suspended. These carrying pans 5 are spaced a predetermined distance apart on said chains 4. Said conveyer chains 4 are mounted on driving sprocket wheels 6, 7—7, etc., located at one end of the machine, which said sprockets receive their motion from the pulley 8 and the train of intermeshing pinions and gears 9—9, etc., and 10—10 etc. At the opposite end of the machine the said carrying chains 4 pass idler sprocket wheels 11, 12, and 13—13 etc. Intermediate between the two ends of the machine, said chains 4—4 ride upon angle irons 14—14 etc.

15 represents a diaphragm extending horizontally through the machine, and being located near the top thereof.

16 represents an exhauster located at the top of the compartment. This exhauster may be a fan, or any type of exhauster commercially sold for drawing air out of a compartment. It also may be propelled by an electric motor or any other power means. Its suction pipe 17 has its mouth extending inside the compartment and its discharge pipe 18 outside the compartment. It is provided with a cut-off valve 19, whereby the quantity of air taken from the closed compartment in a predetermined time period may be controlled and regulated. In the bottom of the said closed compartment I have shown means for cooling the air, which consists of a series of coils of pipe 20. Through these coils refrigerating substances may be caused to flow, which may consist either of cold water, cold brine from the brine tank of a refrigerating machine, or any other substances which will absorb large quantities of heat. I have provided these pipes with valves 21 and 22 for the purpose of controlling the temperature of the said refrigerating coils by regulating the amount of refrigerating material which may flow through them in a predetermined time period. These pipes are shown extended outside of the closed compartment and may be connected in any suitable manner to any suitable source of refrigerating supply means.

23 represents any suitable type of humidifier which may be propelled by pulley 24 or any other suitable means.

25 represents a pipe for the purpose of supplying water to the humidifier. 26 is a cut-off valve in said pipe 25 for the purpose of regulating the quantity of water which may flow through said pipe in a predetermined time period.

27 represents the discharge pipe from the humidifier through which humidified air is forced into the closed compartment. The arrows below and above indicate the direction in which the humidified air flows.

28 represents a cut-off valve for the purpose of controlling and regulating the quantity of humidified air which may be injected into the compartment in a predetermined period of time.

29 represents the openings of the pipe 27 into the closed compartment.

The operation of the machine is as follows: Power is applied to the pulley 8 by means of a belt. Through the train gears 9, 10, etc., the endless conveyer chains 4 begin to move in the direction indicated by the arrow marked B. As the carrying pans proceed upwardly past the platform 2, loaves of bread are deposited thereon by manual means. From this point the bread is carried upwardly to a point near the top of the closed compartment; thence horizontally toward the drive end of the machine; thence dropping to a lower plane. travels horizontally toward the feed end of the machine; thence dropping to a still lower plane travels horizontally toward the drive end of the machine again, and this process of traveling back and forth and dropping successively to lower planes is continued until the bread has reached the bottom of the conveyer at the point 30, where it is taken away, ready for shipment.

In preparing the machine for use, the valves 21 and 22 on the refrigerating coils are opened and refrigerating fluid is forced through the said coils. By this means, the temperature of the atmosphere in the bottom of the closed compartment is greatly reduced. Also the humidifier 23 is put in operation by the pulley 24 and power applied thereto. The valve 26 is opened, and water is caused to flow through the pipe 25. The valve 28 is opened, and humidified air is injected into the closed compartment. The air exhauster 16 is put into operation, and the valve 19 is opened. When the loaves of bread are taken from the bakeoven they are extremely hot, being about 500 degrees in temperature, Fahrenheit. In this hot condition they are immediately transferred to the loading platform 2, from which point they are placed upon the carrying pans as heretofore stated. Upon said carrying pans the hot loaves are first carried to a point near the top of the closed compartment and are thence conveyed by the endless conveyer chains 4 back and forth through the machine until they arrive at the discharge point 30, heretofore mentioned. It will be noted that the bread is first conveyed to a high plane in the machine where the cooling process begins. Here the air becomes very hot from the heat of the bread. At this point it is desirable to discharge from the upper part of the compartment just enough of this superheated air to keep the temperature at this point sufficiently below that of the bread to promote a gradual cooling process. The exhauster 16 is used for discharging the aforesaid surplus superheated air, which allows colder air from the bottom of the compartment to rise and take its place. By continuing this process the temperature of the air at the top of the compartment may be kept substantially uniform, and the air at the bottom will continue to rise, and as it rises will gradually increase in temperature by both radiation and convection. It is now apparent that with extremely hot bread continually passing through the upper part of the compartment and giving off large quantities of heat; and refrigerating means in the bottom of said compartment reducing its surrounding air to a very low temperature; and an exhauster at the top of the compartment discharging a predetermined quantity of superheated air per interval of time, the air between the bottom and top will continue to rise, and at the same time to increase in temperature as it rises, thereby insuring a wide range of temperatures from the top to the bottom, which range is substantially uniform for each successive drop. It is also now apparent that the bread is first introduced into an atmosphere differing the least in degrees from that of the temperature of the bread, and as the bread is dropped from elevation to elevation, the temperature of the air through which it is passing is sufficiently lower than that of the bread to insure a substantially uniform reduction of temperature of the bread during each successive uniform time period. While I have described the power for the conveyer as being applied to the pulley 8 by means of a belt, any other usual means may be adopted. In the use of such conveyers, it is customary to supply means for increasing or diminishing the velocity of the conveyer to a speed above or below normal speed. For such purposes a number of commercial types of variable speed devices are in common use, and while I have not shown any such device, in the practical application of my invention I intend to provide such means for varying the speed of the conveyer.

The method of cooling bread now in common use consists in placing the hot bread upon wire shelves or portable racks. These racks are open on all sides so as to allow the surrounding air to have free access to the bread. In bakeries having a large output of bread a great many racks are required for this method of cooling, and consequently a great deal of floor space is required for these racks. They are usually pushed into an outside room adjacent to the room in which the ovens are situated, while the bread undergoes the cooling process. Here the bread is subjected to drafts of air occasioned by opening doors and windows, which hasten the cooling process. Also, in ordinary rooms of this kind, it is impossible to keep the temperature of the air uniform from day to day, and the humidity of the air in such rooms usually depends upon the condition of the air outside, and consequently varies from day to day. Under this old process a uniformity of bread is impossible; some of the loaves which have received too sudden cooling when hot, show many cracks in the surface of the hard top crust. While this does not injure the bread as an article of food, it renders it unsalable. Under the most auspicious conditions for cooling bread now in common use, bread having a temperature of 500 degrees Fahrenheit is placed in a room the atmospheric temperature of which may be from 70 to 90 degrees and under such conditions it is evident that the cooling takes place very rapidly at first, and as the cooling continues the measure of heat taken off the bread decreases during each successive unit of time, and as the temperature of the bread approaches the temperature of the surrounding air very little heat is taken off in a unit of time. Also, under this old method of cooling bread, when the humidity of the surrounding air is of low percentage, the bread after being cooled will contain less moisture, most of the moisture having evaporated during the cooling process. For such bread the sale is limited, as such bread will not keep fresh a length of time sufficient to enable the merchant to sell it. Also, in this old method of cooling bread there are no means supplied for regulating the length of time the bread remains in the cooling room. As the racks are pushed into this room they are usually so close together that after a couple of hours during which the cooling process goes on, it is impossible to determine which bread entered the cooling room first, or in other words, the order in which the bread entered the cooling room. On this account some of the bread which entered the cooling room last may be packed first, and that which entered the cooling room first may be packed last, there being nothing to insure any order in this process. Under the method which I have put into use by this machine, when the proper adjustment has been made in the valve 19 of the exhauster 16 and the proper adjustments have been made in the valves 21 and 22 of the refrigerating coils 20; and the exhauster, refrigerating means, and the endless conveyer are put into operation; and hot bread is being carried through the machine, as heretofore explained; substantially uniform quantities of heat will be taken from the bread during each successive uniform time period. This results in the bread cooling gradually throughout the cooling process, and this gradual cooling is uniform during each successive uniform time period. By this method absolute uniformity of atmospheric conditions by which the bread is cooled may be established, and is at all times within the control of the baker. Also, by this method the bread is cooled during a fixed, predetermined period of time, since the loaves are taken off the carrying pans in the same order in which they are put thereon. This feature alone of the process not only contributes to better bread, but is a great time saver. By this method which I have put into use, a high quality of bread is insured, the heat is removed from the bread without deterioration in quality or appearance, preserving in the cooled loaf the same quality and appearance which it had when taken from the bakeoven.

In conjunction with the means which I have supplied for cooling the bread I have also supplied means for humidifying the air within the closed compartment while the cooling process is in progress. This consists of the humidifier 23, and its accompanying parts, as heretofore explained. This serves to keep sufficient moisture within the hot loaf of bread from evaporating during the cooling process, and prolongs the time during which the bread remains fresh and salable. By the valve 28 of the humidifier 23 the volume of humidified air which may be injected into the closed compartment is regulated and controlled. Also by regulating the valve 19 of the exhauster 16 and the valves 21 and 22 of the refrigerating coils 20, the temperature of the atmosphere within the closed compartment may be regulated and controlled. The diaphragm 15 is used for the purpose of distributing the cold air as it rises, which reduces the temperature of the hot air above. Without this diaphragm, currents of cold air would rise directly into the exhauster. Arrows 31, shown in Fig. 1 and Fig. 2, show the direction the air takes in rising above the diaphragm.

I claim:

1. In the method of cooling and treating bread, the herein described process, which consists of subjecting hot bread successively to a range of cooling temperatures each in succession being lower in degree throughout the cooling process.

2. In the method of cooling and treating bread, the herein described process, which consists of subjecting hot bread successively to a range of cooling temperatures, each in succession lower in degree throughout the cooling process, which process takes place during a predetermined period of time.

3. In the method of cooling and treating bread, the herein described process, which consists of conveying hot bread through successive atmospheres the temperatures of which are uniformly lower in degree than that of the bread throughout the cooling process.

4. In the method of cooling and treating bread, the herein described process, which consists of subjecting hot bread successively to a range of temperatures each lower in degree than that of the bread whereby the cooling of the bread takes place gradually.

5. In the method of cooling and treating bread, the herein described process, which consists of subjecting the hot bread to a range of cooling temperatures whereby substantially uniform measures of heat are taken from the bread during successive uniform periods of time.

6. In the method of cooling and treating bread, the herein described process, which consists of conveying hot bread through atmosphere having a range of cooling temperatures and a predetermined degree of humidity, for the purpose of cooling the bread and preserving a certain degree of moisture therein while undergoing the cooling process.

WINFIELD M. CAMPBELL.

Witnesses:
R. A. WALKER,
P. M. FERGUSON.